United States Patent
Lee et al.

(10) Patent No.: US 8,942,843 B2
(45) Date of Patent: Jan. 27, 2015

(54) TOOL PATH FORMING METHOD IN MILLING PROCESSING SYSTEM

(75) Inventors: Sung Gun Lee, Gyeonggi-do (KR); Yong Tak Hyun, Seoul (KR)

(73) Assignee: Doosan Infracore Co., Ltd., Incheon (KR)

( * ) Notice: Subject to any disclaimer, the term of this patent is extended or adjusted under 35 U.S.C. 154(b) by 481 days.

(21) Appl. No.: 13/501,030

(22) PCT Filed: Oct. 8, 2010

(86) PCT No.: PCT/KR2010/006906
§ 371 (c)(1),
(2), (4) Date: Apr. 9, 2012

(87) PCT Pub. No.: WO2011/043626
PCT Pub. Date: Apr. 14, 2011

(65) Prior Publication Data
US 2012/0203373 A1    Aug. 9, 2012

(30) Foreign Application Priority Data
Oct. 9, 2009    (KR) .................. 10-2009-0096095

(51) Int. Cl.
*G05B 19/18*    (2006.01)
*G06F 19/00*    (2011.01)
*G05B 19/4097*    (2006.01)

(52) U.S. Cl.
CPC .. *G05B 19/4097* (2013.01); *G05B 2219/35097* (2013.01); *G05B 2219/35111* (2013.01); *G05B 2219/45136* (2013.01)

USPC ........... 700/180; 700/176; 700/178; 700/179; 700/183; 700/184; 700/189; 700/191; 318/569

(58) Field of Classification Search
USPC ......... 700/176, 178, 179, 180, 183, 189, 191, 700/184; 318/569
See application file for complete search history.

(56) References Cited

U.S. PATENT DOCUMENTS

| 4,445,182 | A |   | 4/1984  | Morita et al. |
|-----------|---|---|---------|---------------|
| 4,713,747 | A | * | 12/1987 | Niwa ............................ 700/180 |
| 4,720,796 | A | * | 1/1988  | Kishi et al. .................... 700/178 |

(Continued)

FOREIGN PATENT DOCUMENTS

| JP | 2000-084794 A | 3/2000 |
| JP | 2006-139503 A | 6/2006 |
| KR | 10-0872394 B1 | 12/2008 |

OTHER PUBLICATIONS

Search Report dated Jun. 15, 2011 written in Korean with English translation attached for International Application No. PCT/KR2010/006906, filed Oct. 8, 2011, pp. 1-5.

(Continued)

*Primary Examiner* — Mohammad Ali
*Assistant Examiner* — Jennifer L Norton
(74) *Attorney, Agent, or Firm* — John D. Veldhuis-Kroeze; Westman, Champlin & Koehler, P.A.

(57) ABSTRACT

The present invention provides a tool path forming method in a milling processing system, the method including: (A) a shape offset step; (B) a virtual wall forming step; (C) an interference region forming and shape revising step; (D) a closed shape forming step; (E) a cutting surface forming step; (F) tool path forming steps; (G) an unprocessed region detecting step; and (H) an uncut region tool path forming step.

6 Claims, 15 Drawing Sheets

(56) References Cited

U.S. PATENT DOCUMENTS

| | | | |
|---|---|---|---|
| 4,789,931 A | | 12/1988 | Kuragano et al. |
| 5,014,209 A | * | 5/1991 | Nankaku et al. ............. 700/193 |
| 5,122,966 A | | 6/1992 | Jansen et al. |
| 5,128,870 A | * | 7/1992 | Erdman et al. ................ 700/163 |
| 5,134,570 A | | 7/1992 | Nankaku |
| 5,251,143 A | * | 10/1993 | Maeda .......................... 700/176 |
| 8,805,570 B2 | * | 8/2014 | Kawauchi et al. ............ 700/159 |

OTHER PUBLICATIONS

Office Action dated Nov. 13, 2013 issued in Chinese Patent Application No. 201080045219.3, 7 pages.
Extended European Search Report dated Mar. 22, 2013 for European Patent Application No. 10822271.2, 8 pages.
Chang, M. et al., "Tool-Path Generation for Sidewall Machining," Computers & Industrial Engineering, Pergamon, Amsterdam, NL, vol. 56, No. 4, May 1, 2009, pp. 1649-1656.

* cited by examiner

TOOL PATH FORMING METHOD IN MILLING PROCESSING SYSTEM

This Application is a Section 371 National Stage Application of International Application No. PCT/KR2010/006906, filed Oct. 8, 2010 and published, not in English, as WO2011/043626 on Apr. 14, 2011.

FIELD OF THE DISCLOSURE

The present disclosure relates to a milling processing system, and more particularly, to a tool path forming method in a milling processing system.

BACKGROUND OF THE DISCLOSURE

When a user writes a processing program in a general computerized numerical control (CNC) machine tool, the ability to write a program that is not only capable of processing simple shapes but also complicated and varied shapes is required. Because it is very difficult for a user to directly program machine commands in order to process a complicated shape, a device for automatically programming machine commands is required, and this device is a tool path automatic forming device. The processing know—how of a machine user is contained in this device, and currently, not only is the tool path forming function included, but functions such as those for detecting tool collisions and unmilled areas are also included.

Meanwhile, for this tool path for milling, because interference regions necessarily arise in which processing is actually not possible due to the tool angles of tools, a method of forming a tool path that avoids interference regions is required.

However, methods of forming a tool path for milling in the related art are mostly methods for forming a tool path formed in only a straight line in order to avoid interference regions.

Further, even in the case of an arc shape, because the starting point of an interference region has been considered simply as a contact point in an arc, when a starting point (P) of an interference region, as illustrated in FIG. 12, is not a contact point in an arc, but is an intersecting point, a tool forming path that avoids an interference region cannot be formed.

The discussion above is merely provided for general background information and is not intended to be used as an aid in determining the scope of the claimed subject matter.

SUMMARY

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

The present disclosure is contrived to solve the problems, and an object of the present disclosure is to provide a method for forming a tool path capable of effectively avoiding an interference region between a workpiece material and a tool.

Further, an object of the present disclosure is to provide a tool path forming algorithm capable of being used in common for forming various tool paths including inner diameter and outer diameter processing and sectional processing, so as to increase the efficiency of tool path forming.

In order to achieve the above object, the present disclosure provides a tool path forming method in a milling processing system, the method including: (A) a shape offset step (S10) of receiving an input of a shape from a user or recognizing a shape depicted in a drawing, dividing the shape into one or more shape elements, and offsetting the inputted shape by as much as a process margin; (B) a virtual wall forming step (S20) of forming a virtual wall in consideration of dimensions of a work piece; (C) shape revising steps (S30 and S40) of receiving tool information and forming an interference region formed by means of a tool angle of a tool, determining whether the interference region is formed for each of the shape elements on the basis of a shape working axis of the shape elements and the tool angle of the tool, and revising the shape elements for preventing the forming of the interference region; (D) a closed shape forming step (S50) of making revised shapes into closed shapes; (E) a cutting surface forming step (S60) of forming a cutting surface in a processing depth direction; (F) tool path forming steps (S70 and S80) of obtaining an intersecting point of the cutting surface and the shape elements, and forming a tool path from the intersecting point; (G) an unprocessed region detecting step (S90) of detecting whether shape elements included in an unprocessed region to the interference region in step (C) exist; and (H) an uncut region tool path forming step (S110) of changing a tool to a tool capable of processing the unprocessed region when the unprocessed region is detected, and forming an uncut region tool path.

According to an exemplary embodiment of the present disclosure, in step (C), whether the interference region is formed may be determined differently according to whether the shape elements are in a straight line or an arc.

That is, when the shape elements are on a straight line, and when the angle formed by the shape elements and the shape working axis is greater than the absolute value of the tool angle of the tool, the shape elements may be determined to be included in the interference region.

Further, when the shape elements are in an arc, and when a virtual line is formed having an angle formed by the shape working axis and 180°+the tool angle, determining may be performed on whether to include the arc in the interference region when the virtual line meets the arc that is one of the shape elements at an intersecting point.

In addition, when the virtual line intersects the arc that is one of the shape elements, the arc in the interference region is included when a start point or an end point of the arc exists between angles (θ1, θ2) disposed on a circle including the arc that are between 90°+the tool angle and 270°+the tool angle or between −90°+the tool angle and 90°+the tool angle, with respect to the shape working axis.

According to the present disclosure, a tool path may be formed that avoids an interference region formed by a tool angle of a tool, not only for a straight shape but for an arc shape as well.

Further, according to the present disclosure, by providing a unified method capable of defining and avoiding an interference region for various types of processing techniques (inner diameter, outer diameter, sectional processing, etc.), tool paths may be effectively formed for assorted processing techniques (inner diameter, outer diameter, sectional processing, etc.), so as to raise the efficiency of tool path forming.

DETAILED DESCRIPTION

Hereinafter, exemplary embodiments of the present disclosure will be described in detail with reference to the accompanying drawings.

Figure 1A:
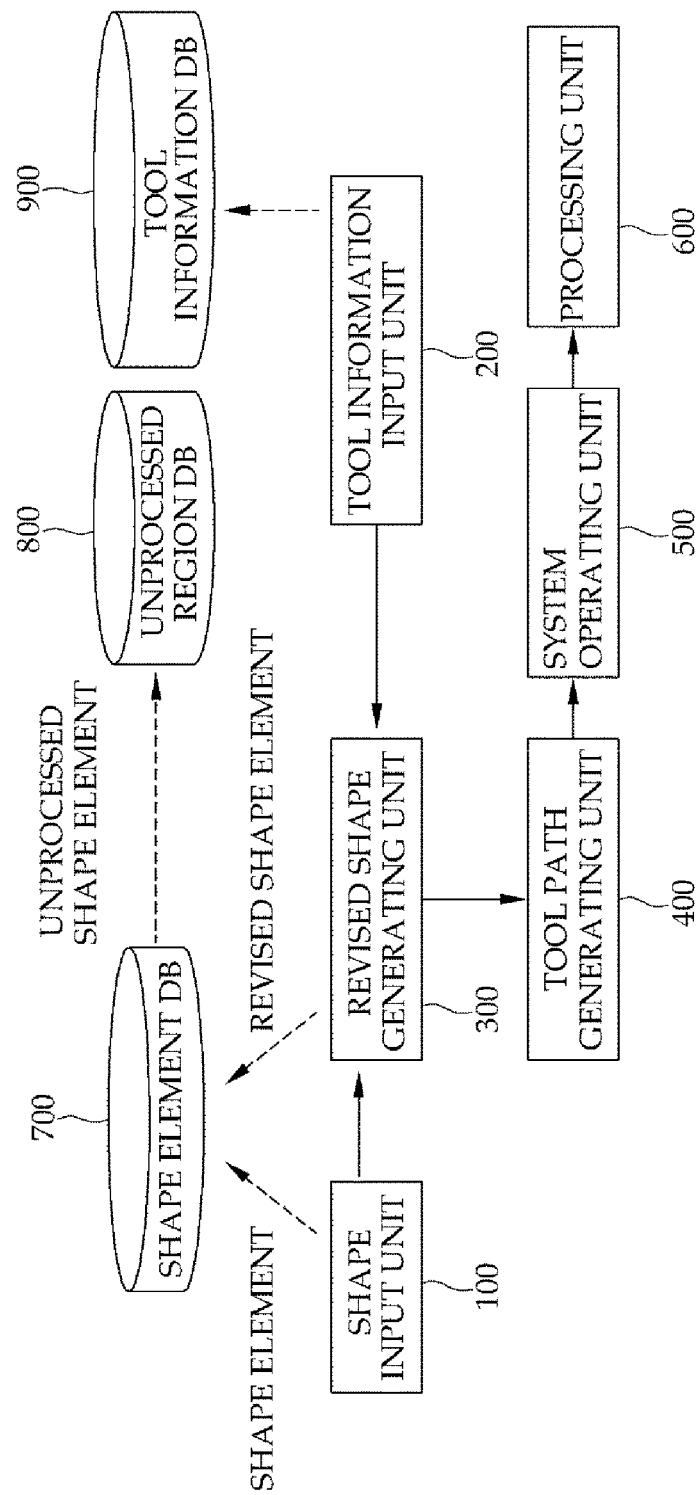
FIG. 1A is a configurative diagram of an overall milling processing system according to an exemplary embodiment of the present disclosure.
Figure 1B:
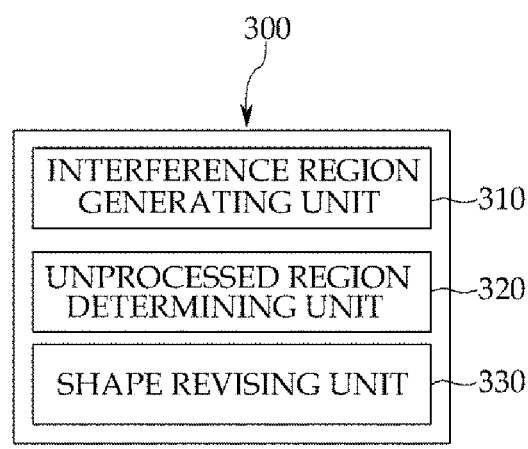
FIGS. 1B to 1D are detailed configurative diagrams of a milling processing system according to an exemplary embodiment of the present disclosure.
Figure 1C:
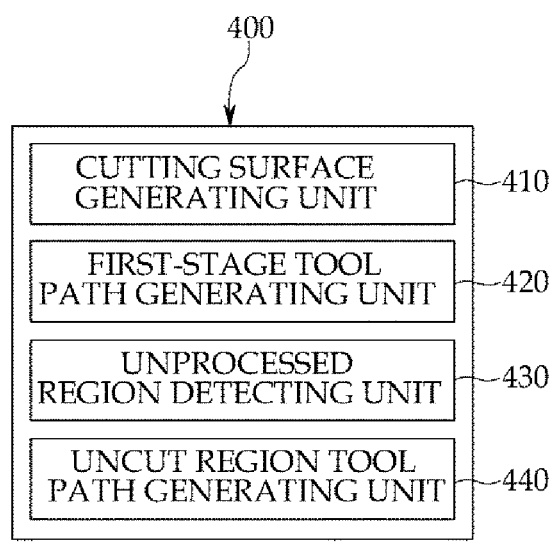
Figure 1D:
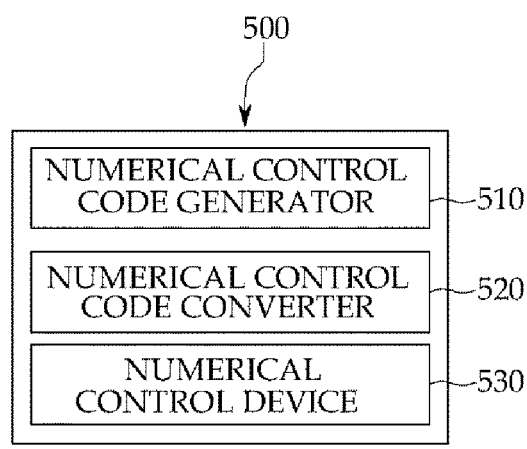

FIG. 1 is a configurative diagram showing a milling processing system according to an exemplary embodiment of the present disclosure, where FIG. 1A is an overall configurative diagram of the milling processing system according to the exemplary embodiment of the present disclosure, and FIGS. 1B to 1D are detailed configurative diagrams thereof.

Referring to FIG. 1A, the milling processing system according to the exemplary embodiment of the present disclosure includes a shape input unit 100, a tool information input unit 200, a revised shape generating unit 300, a tool path generating unit 400, a system operating unit 500, a processing unit 600, a shape element DB 700, an unprocessed region DB 800, and a tool information DB 900.

The shape input unit 100 is divided into one or more shape elements C0, C1, . . . Cn input by a user or recognized from shapes in diagrams (refer to FIGS. 4 and 5).

The tool information input unit 200 receives an input of tool information.

The revised shape generating unit 300 determines whether an interference region will be formed between each shape element, when a tool input to the tool information input unit 200 is circulated according to shape elements recognized from the shape input unit 100, and revises the shape elements so that an interference region is not formed. The revised shape generating unit 300 transfers shape elements determined as unprocessed regions from a shape element DB 700 to an unprocessed region DB 800, and stores the transferred shape elements, and revises the unprocessed elements and stores revised shape elements that are not included in interference regions in the shape element DB 700.

The tool path generating unit 400 generates a tool path from the intersecting point between a shape generated by the revised shape generating unit 300 and a tool cutting surface input to the tool information input unit 200.

The system operating unit 500 converts the tool path generated by the tool path generating unit 400 to a numerical code (NC) and generates a machine driving signal therefrom.

The processing unit 600 performs processing with the tool according to the machine driving signal from the system operating unit 500.

After a shape input through the shape input unit 100 is divided into a plurality of shape elements, it is stored in the shape element DB 700.

Shape elements (shape elements that are not included in interference regions), determined as unprocessed regions by an unprocessed region determining unit 320 of the revised shape generating unit 300, are stored in the unprocessed region DB 800.

The detailed structures of the revised shape generating unit 300, the tool path generating unit 400, and the system operating unit 500 will be provided with reference to FIGS. 1B to 1D.

FIG. 1B shows the detailed structure of the revised shape generating unit 300. As shown, the revised shape generating unit 300 includes an interference region generating unit 310, the unprocessed region determining unit 320, and a shape revising unit 330.

The interference region generating unit 310 determines whether an interference region is formed for each shape element on the basis of the shape working axes of shape elements recognized from the shape input unit 100 and the tool angle of the tool, and forms an interference region. A direction of the shape working axis is determined differently according to the type of a tool angle of a tool, and the direction is set the same as a cutting angle when the tool angle of a tool is a minor cutting edge ($\beta$), and the direction is set the opposite of the cutting angle when the tool angle of the tool is a major cutting edge (a) (refer to FIGS. 4 and 5).

The unprocessed region determining unit 320 determines a shape element included in an interference region as an unprocessed region.

The shape revising unit 330 revises a shake element determined as an unprocessed region so as not to include it in an interference region, and generates a revised shape element.

FIG. 1C shows the detailed structure of the tool path generating unit 400. As shown, the tool path generating unit 400 includes a cutting surface generating unit 410, a first-stage tool path generating unit 420, an unprocessed region detecting unit 430, and an uncut region tool path generating unit 440.

The cutting surface generating unit 410 generates a cutting surface in a processing depth direction.

The first-stage tool path generating unit 420 obtains intersecting points between a shape generated in the shape revising unit 330 and a cutting surface, and connects each intersecting point to an endmost path in order to generate a tool path.

The unprocessed region detecting unit 430 detects whether an unprocessed region determined by the unprocessed region determining unit 320 exists.

The uncut region tool path generating unit 440 changes a tool to a tool capable of processing an unprocessed region when the unprocessed region is detected by the unprocessed region detecting unit 430, and generates an uncut region tool path.

FIG. 1D shows the system operating unit 500. As shown, the system operating unit 500 includes a numerical control code converter 510 for converting a tool path generated in the tool path generating unit 400 to a numerical control code, and a numerical control device 520 for generating a machine shaft driving signal from the numerical control code and generating a control signal for driving a machine.

A tool path forming method in the above-structured milling processing system according to an exemplary embodiment of the present disclosure will be described with reference to FIGS. 2 and 3.

Figure 2:
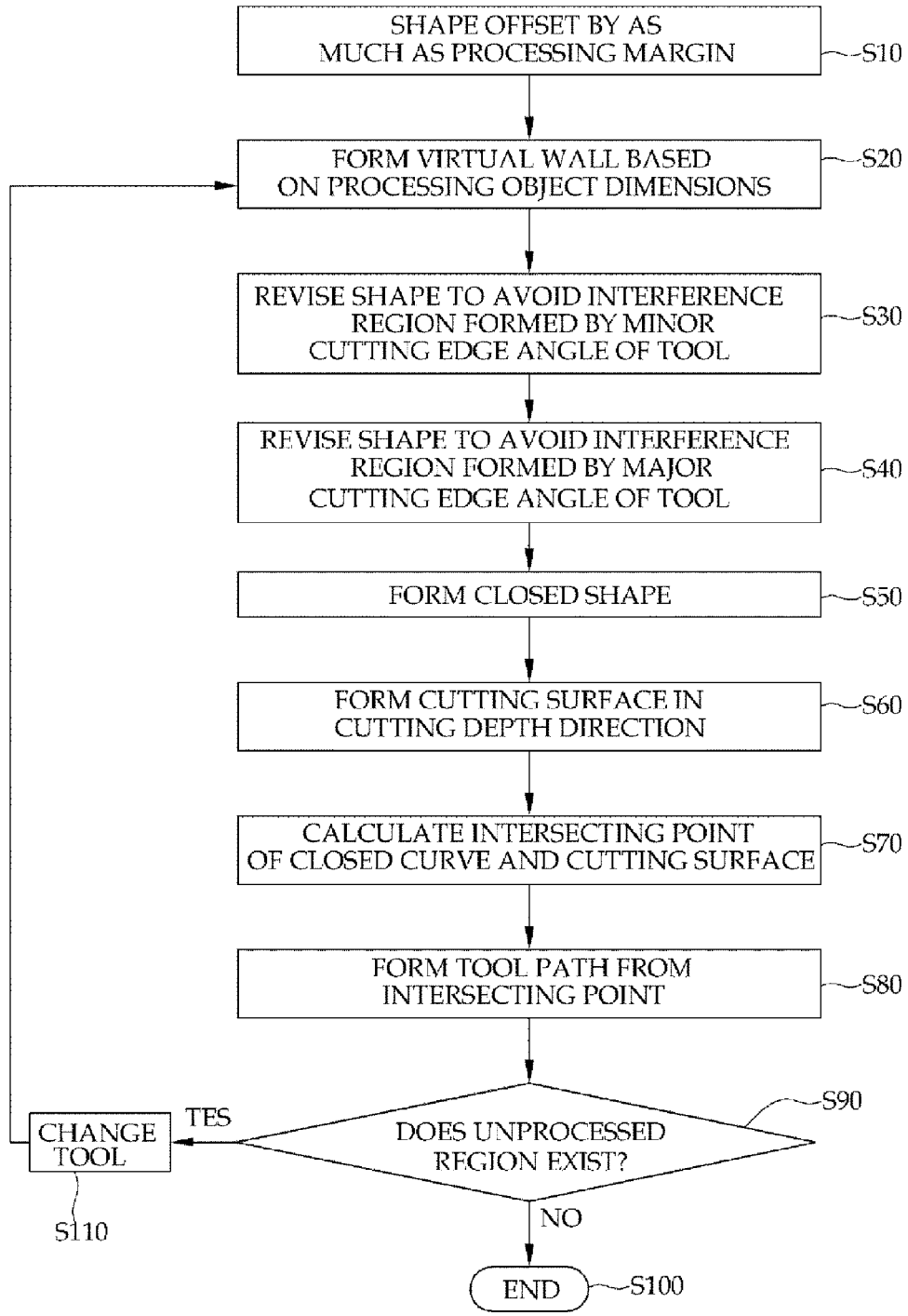
FIG. 2 is a flow chart showing an overall tool path forming method in a milling processing system according to an exemplary embodiment of the present disclosure.
Figure 3:
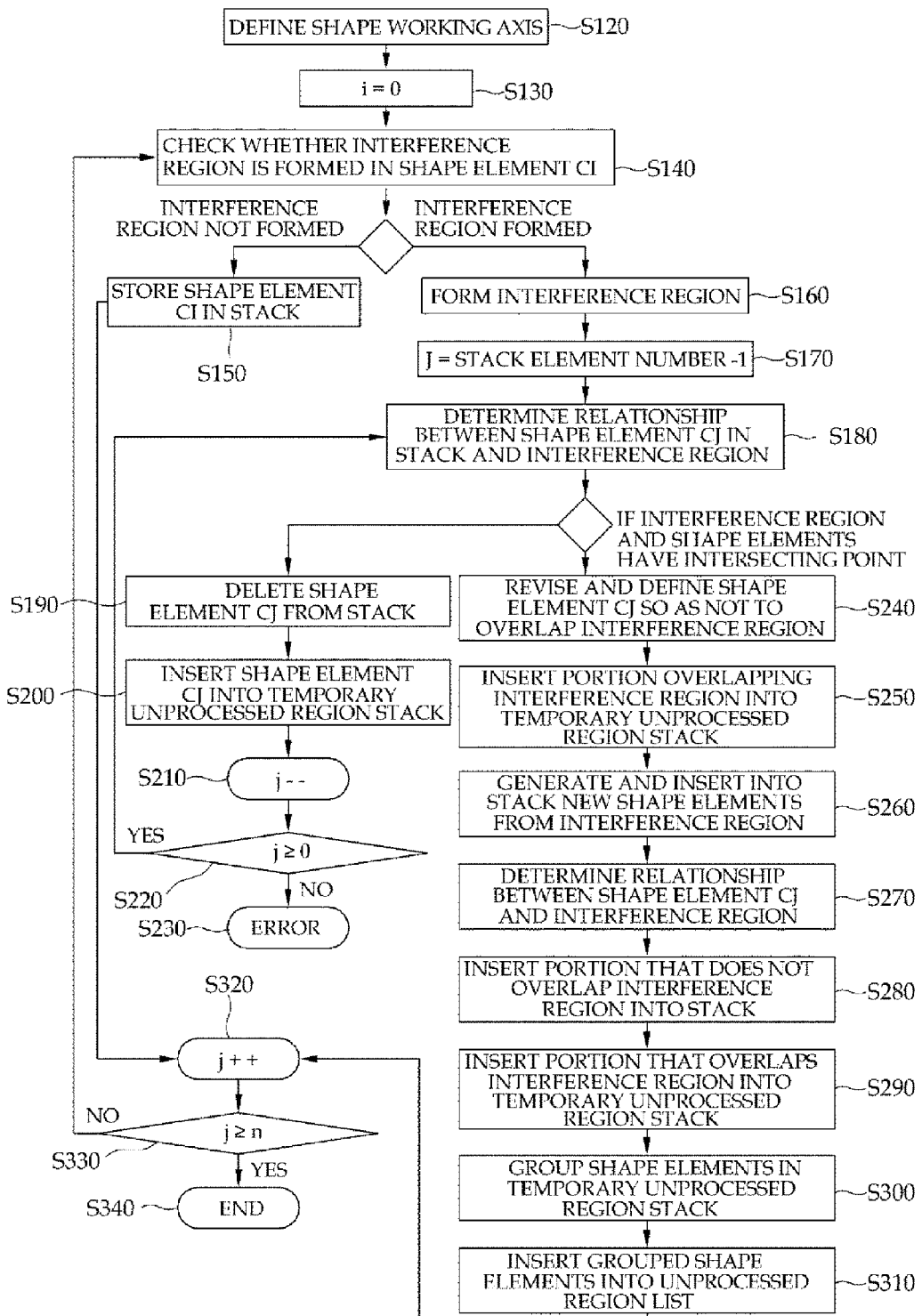
FIG. 3 is a detailed flow chart showing steps S30 and S40 in FIG. 2.

FIG. 2 is a flow chart showing an overall tool path forming method in a milling processing system according to an exemplary embodiment of the present disclosure, and FIG. 3 is a detailed flow chart.

Referring to FIG. 2, a milling processing system according to an exemplary embodiment of the present disclosure includes: a shape offset step S10, a virtual wall forming step S20, shape revising steps S30 and S40, a closed shape forming step S50, a cutting surface forming step S60, an intersecting point calculating step S70 of calculating the intersecting point of the cutting surface, a tool path forming step (S80), an unprocessed region detecting step S90, and an uncut region tool path generating step S110.

While a virtual wall forming step S20 is included between the shape offset step S10 and the shape revising steps S30 and S40 in FIG. 2, the virtual wall forming step S20 is not necessarily required and may be omitted. That is, the shape revising steps S30 and S40 may be performed immediately after the shape offset step S10.

While the shape offset step S10 is shown as being performed before the shape revising steps S30 and S40 in FIG. 2, the shape offset step S10 may be performed after the shape revising steps S30 and S40.

Hereinafter, a detailed description of each step will be provided.

In the shape offset step S10, a shape that is initially input by a user or a shape that is depicted in drawings is recognized and divided into one or more shape elements C0, C1, ... Cn, and the input shape is offset by a processing margin.

The virtual wall forming step S20 is a step for forming a virtual wall based on the dimensions of a processing object, and is not necessarily required as stated above. That is, the present step may be omitted after the shape offset step S10, and the shape revising steps S30 and S40 may immediately follow.

However, according to the processing objective, and according to exemplary embodiments, the virtual wall forming step S20 may be performed between the shape offset step S10 and the shape revising steps S30 and S40.

In this case, the virtual wall forming step S20 may include a first step of obtaining a lowest and highest height value of a processing object, a second step of receiving an input of a given tool path starting height, and a third step of selecting and storing one of the height value from the first step and the inputted height from the second step if there is an automatic height selection function, and selecting and storing a tool path starting height if there is no automatic height selection function. Here, the height selected automatically in the third step becomes the highest value for outer diameter processing, and becomes the lowest value for inner diameter processing.

In the shape revising steps S30 and S40, input tool information is received, and an interference region formed by a tool value of a tool is generated. Further, whether an interference region is formed may be determined on the basis of the shape working axes of the shape elements for each of the shape elements and the tool angle of the tool, and the shape elements may be revised so that an interference region is not formed. As shown differently in steps S30 and S40, the interference region is determined differently according to whether the tool angle of the tool is a major cutting edge angle or a minor cutting edge angle.

In the closed shape forming step S50, the revised shape is made in a closed shape.

In the cutting surface forming step S60, a cutting surface is formed in a processing depth direction.

In the intersecting point calculating step S70 and the tool path forming step S80, the intersecting points of the cutting surface and of the revised shape elements are obtained, and a tool path is formed from these intersecting points.

In the unprocessed region detecting step S90, it is detected whether the unprocessed regions (shape elements including interference regions) from the shape revising steps S30 and S40 exist.

In the uncut region tool path forming step S110, if an uncut region is detected, a tool is converted to a tool capable of processing the unprocessed region, and an uncut region tool path is formed.

With reference to FIG. 3 regarding the shape revising steps S30 and S40 in FIG. 2, a more detailed description will be provided. As shown in FIG. 3, the shape revising steps S30 and S40 include steps S120 to S340.

Figure 4:
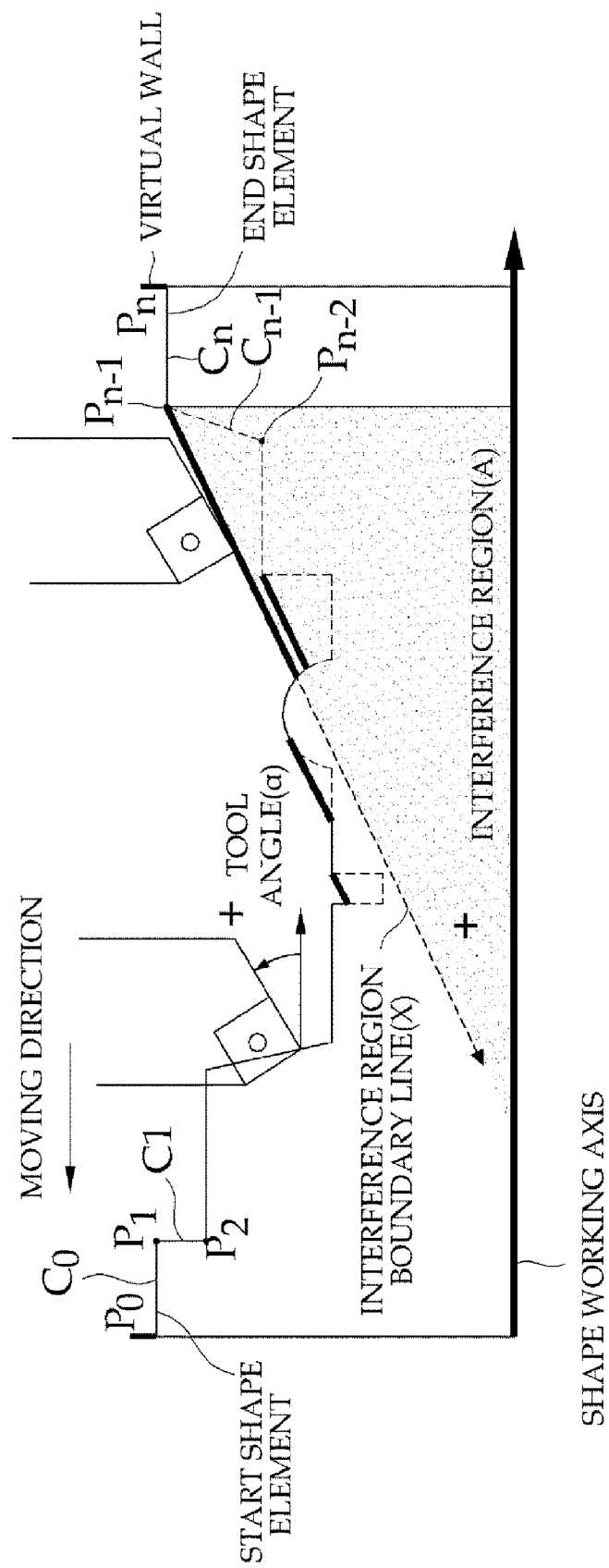
FIG. 4 is a view showing an interference region boundary line (X) and an interference region (A) that are formed when a tool angle of a tool is a minor cutting edge angle ($\beta$).
Figure 5:
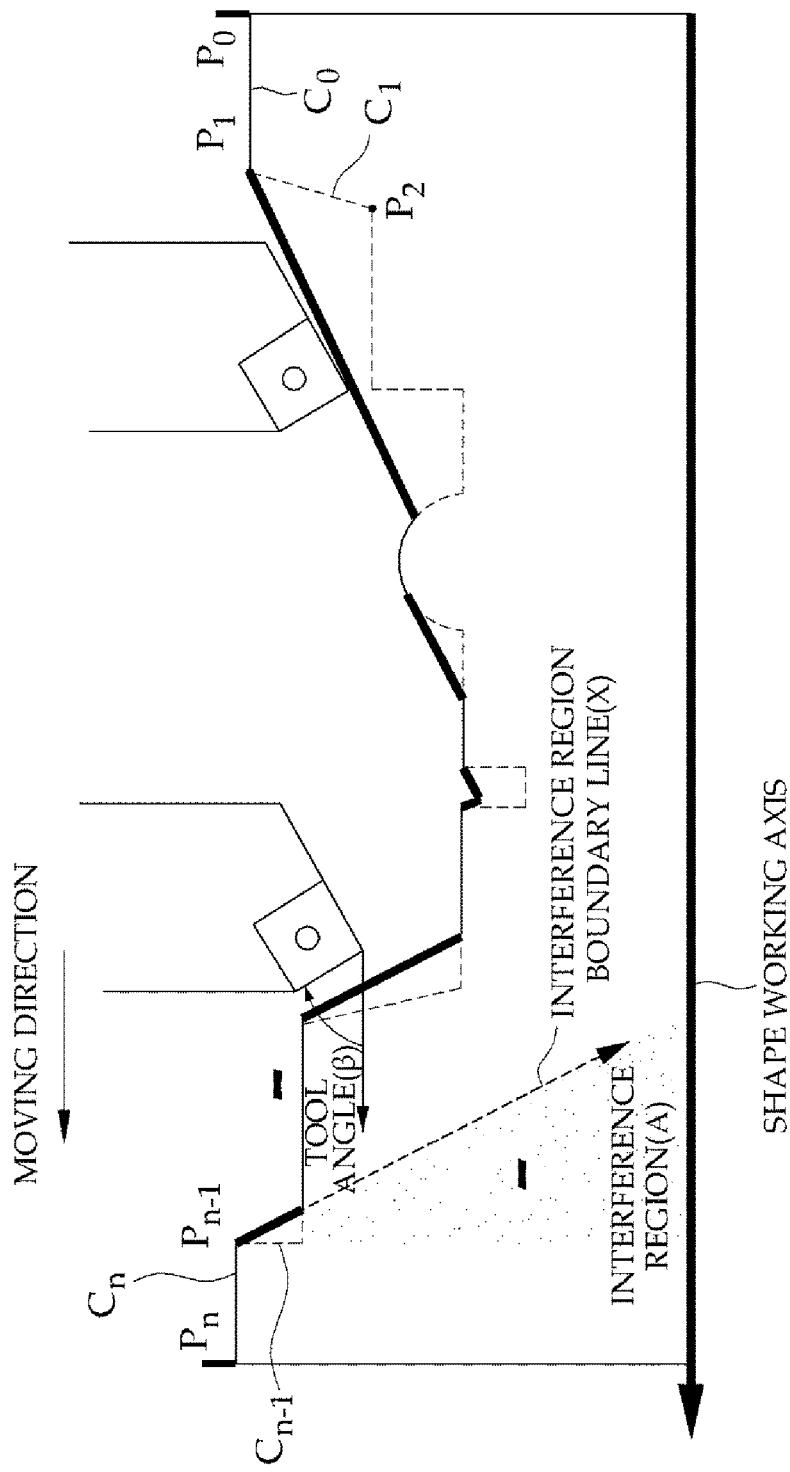
FIG. 5 is a view showing an interference region boundary line (X) and an interference region (A) that are formed when a tool angle is a major cutting edge angle (a).
Figure 10:
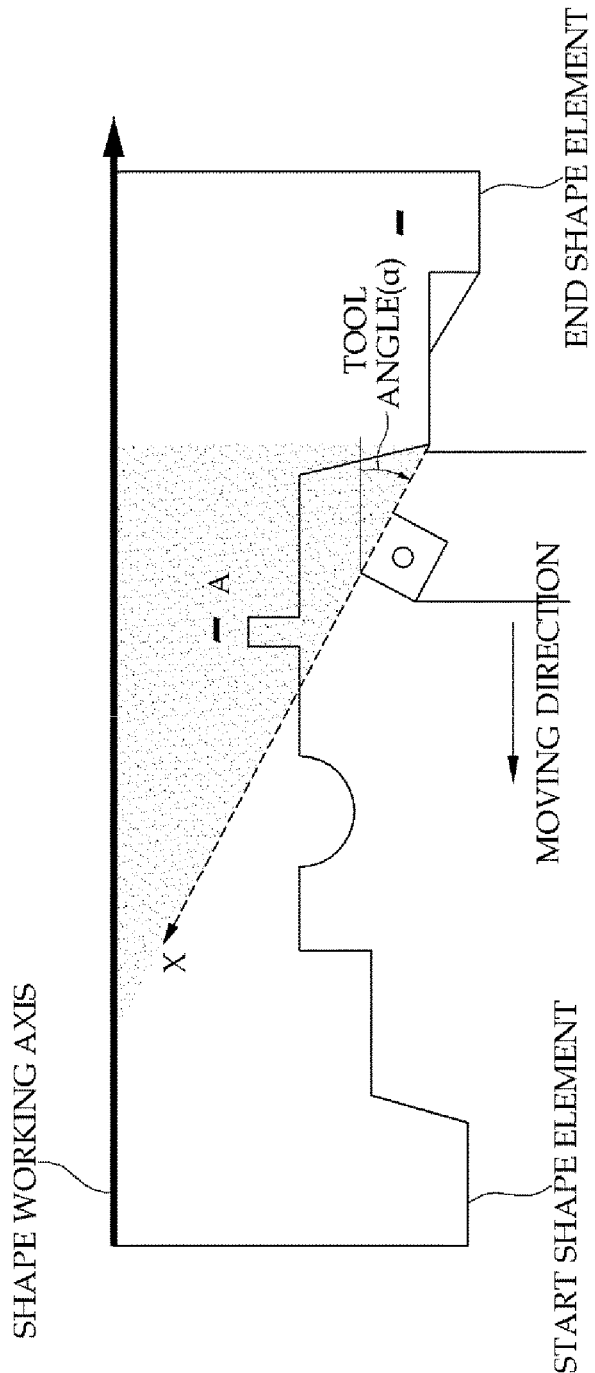
FIG. 10 is a view showing an interference region defined by a shape working axis and a tool angle when processing an inner diameter.
Figure 11:
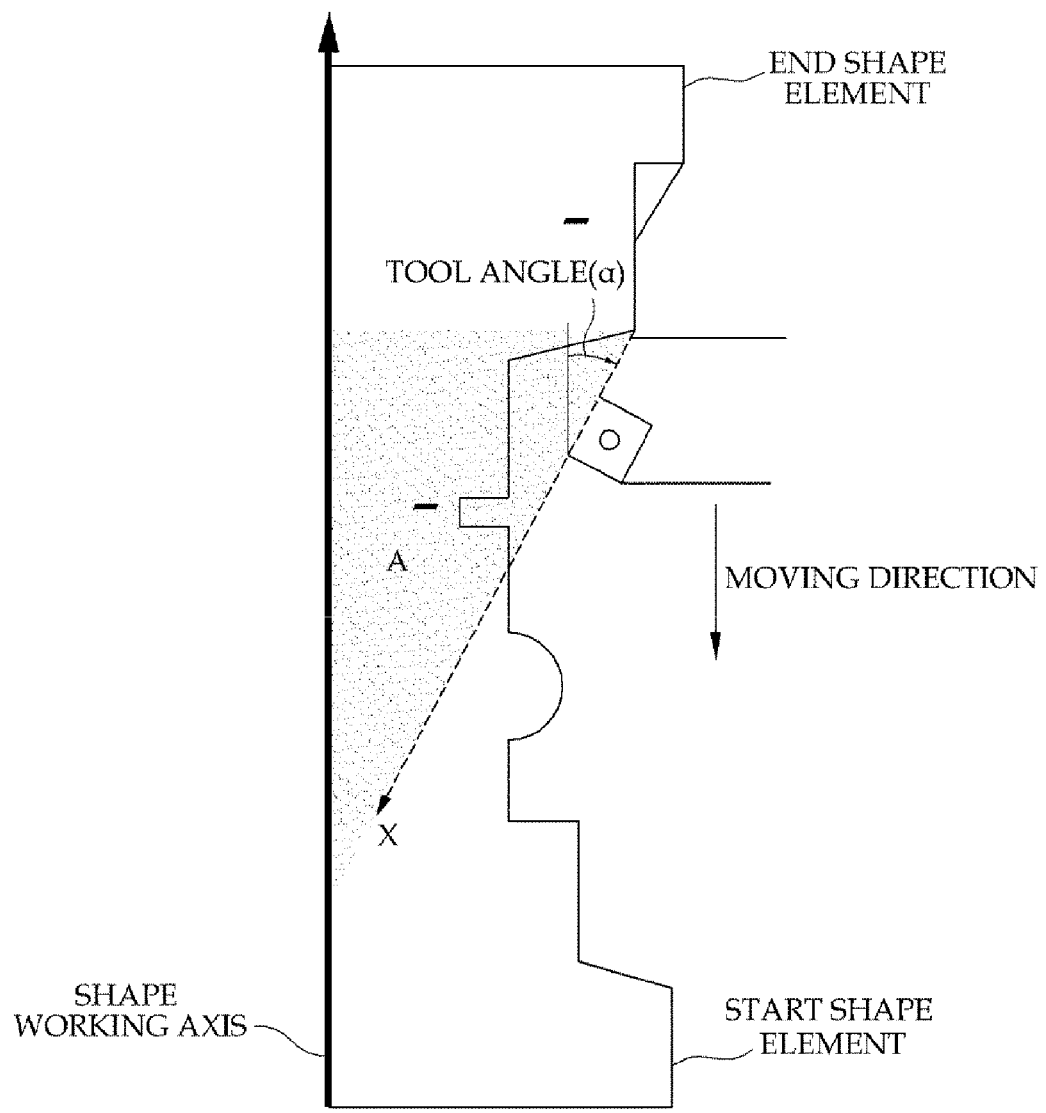
FIG. 11 is a view showing an interference region defined by a shape working axis and a tool angle when processing a section.

In step S120, a shape working axis is defined according to the cutting direction and the type of tool angle. The direction of the shape working axis is determined differently according to the type of tool angle of a tool. That is, as shown in FIGS. 4, 10, and 11, when the tool angle of a tool is a minor cutting edge (a), the shape working angle is set in the direction opposite to that in which the tool is moved, and as shown in FIG. 5, when the tool angle of a tool is a major cutting edge (p), the shape working axis is set in the same direction as that in which the tool is moved.

In the second steps S130 and S320, the shape elements are circulated along the direction of the shape working axis. That is, as shown in FIGS. 4, 10, and 11, when the tool angle of a tool is a minor cutting edge (a), the direction of the shape working axis is in the direction from the left to right of the drawings, circulating from the left to the right in the circulation drawing of the shape elements C0, C1, ... Cn. In a similar way, as shown in FIG. 5, when the tool angle of a tool is a major cutting edge (β), the direction of the shape working axis is in the direction from the right to left of the drawings, circulating from the right to left the in the circulation drawing of the shape elements C0, C1, ... Cn.

In the third step S140, it is checked whether an interference region is formed in the circulating shape elements C0, C1, ... Cn.

If the results of the check indicate that an interference region is not formed, the currently circulating shape elements are stored in the shape element DB 700 [fourth step S150], and if an interference region is formed in the third step, an interference region is formed [fifth step S160].

Next, in the sixth step S180, after being circulated and checked in the fourth step S150, the shape elements stored in the shape element DB 700 are circulated in the reverse order of storage (S170, S210, and S220), and their relationship with the interference region formed in the fifth step S160 is determined.

In the seventh step S190 and S200, a shape element that is included in the interference region, from among the shape elements that are circulated and checked in the sixth step S180, is extracted from the shape element DB 700 and stored in the unprocessed region DB 800.

In the eighth step S240 and S250, if the shape elements circulated in reverse and checked in the sixth step S180 and the interference region have an intersecting point, a portion that does not overlap with the interference region is left remaining in the shape element database 700, and an overlapping portion is stored in the unprocessed region database 800.

In the ninth step S260, new shape elements are generated from the interference region and stored in the shape element DB 700.

In the tenth step S270, S280, and S290, the relationship between the shapes circulating in the second step S130 and S320 and the interference region formed in the fifth step S160 is determined, shape elements that do not overlap with the interference region are stored in the shape element DB 700, and portions that do overlap are stored in the unprocessed region DB 800.

In the eleventh step S300 and S310, shape elements stored in the unprocessed region DB 800 are grouped and defined as an unprocessed region.

The determining of whether an interference region is formed will be described in detail with reference to FIGS. 4 to 12.

FIG. 4 is a view showing an interference region boundary line (X) and an interference region (A) that are formed when a tool angle of a tool is a minor cutting edge angle (β), and FIG. 5 is a view showing an interference region boundary line (X) and an interference region (A) that are formed when a tool angle is a major cutting edge angle (α).

The circulation of shapes for forming an interference region is performed in the direction along the shape working axis. Accordingly, C0 in the drawings becomes the starting shape element, and Cn becomes the last shape element.

When the position of the tool edge corresponding to the tool angle is to the left of the shape working axis moving direction, the sign for the tool angle has a positive (+) value (see FIG. 4), and when the position of the tool edge is to the right of the shape working axis moving direction, the sign for the tool angle has a negative (−) value (see FIGS. 5, 10, and 11).

Further, whether the shape elements are included in the interference region is determined by the sign of the tool angle currently defined. For example, as shown in FIG. 4, if the currently defined tool angle sign is positive (+), being to the left of the interference region boundary line (X) vector moving direction leads to the determining that the shape elements exist in the interference region. Similarly, referring to FIGS. 5, 10, and 11, if the currently defined tool angle sign is negative (−), being to the right of the interference region boundary line (X) vector moving direction leads to the determining that the shape elements exist in the interference region.

That is, the interference region boundary line (X) is defined in a direction parallel to the minor cutting edge (β) or major cutting axis (α) of each tool, and the interference region (A) is defined as a region between the interference region boundary line (X) and the shape working axis. Further, referring to FIG. 1, shape elements included in the interference region (A) are determined as an unprocessed region, and are moved from the shape element DB 700 to the unprocessed region DB 800.

The determining of whether an interference region is formed is made for when shape elements are straight and when they are in an arc.

When Shape Elements are Straight

Figure 6:
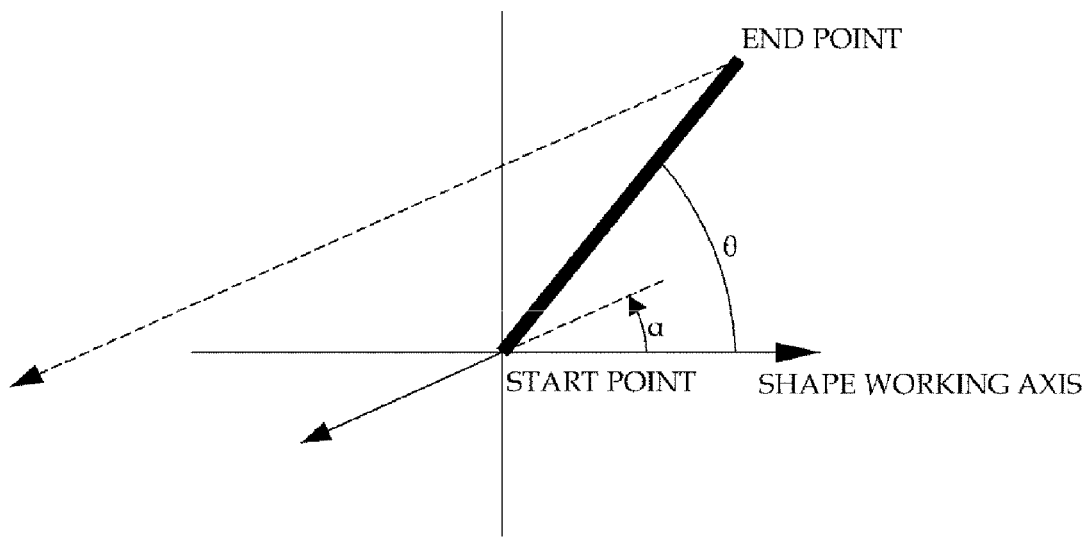
FIG. 6 is a view showing the conditions when an interference region is formed when a given shape element is straight.

As shown in FIG. 6, when shape elements are straight, and an absolute value of an angle (θ) formed by the shape elements and the shape working axis is greater than an absolute value of a given tool angle (a) of a tool, it is determined that an interference region is formed.

Figure 7:
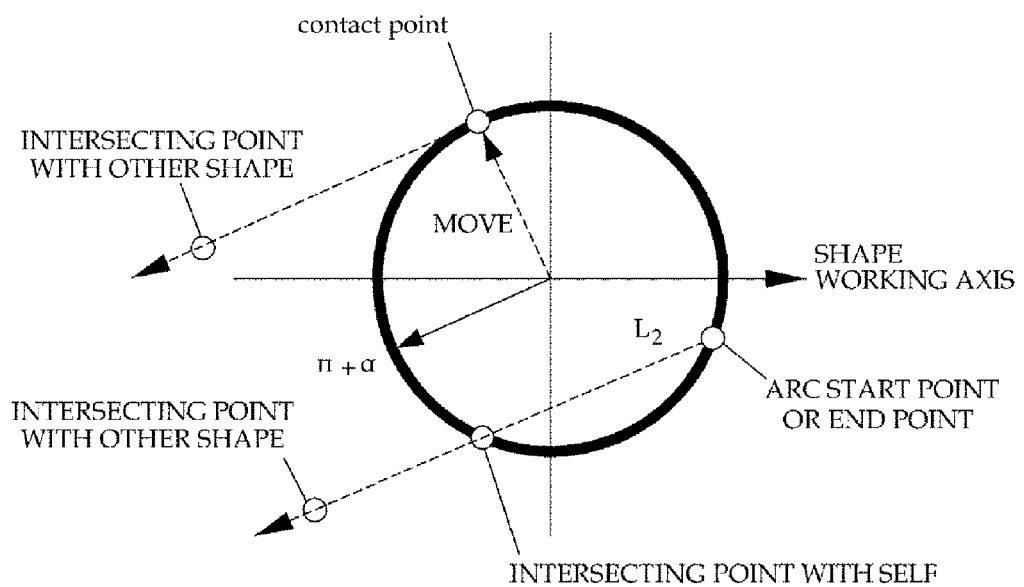
FIG. 7 is a view showing an interference region that is formed when a given shape element is arcuate.

Referring to FIG. 7, when shape elements are in an arc, they are determined according to if the start point of the interference region is a contact point of an arc (L1), and if the start point of the interference region is the start point or end point of an arc (L2).

When Shape Elements are in an Arc 1—Start Point of the Interference Region is a Contact Point in an Arc In the present case, as shown in L1 of FIG. 7, when an angle, formed with the shape working axis from the cross point of a shape element and another adjacent shape element in a direction of the shape elements, extends a virtual line (depicted with a dotted line), which is a tool angle of a tool+180*(a+p) [or tool angle (a)], this virtual line meets the arc at a contact point (P).

Figure 8:
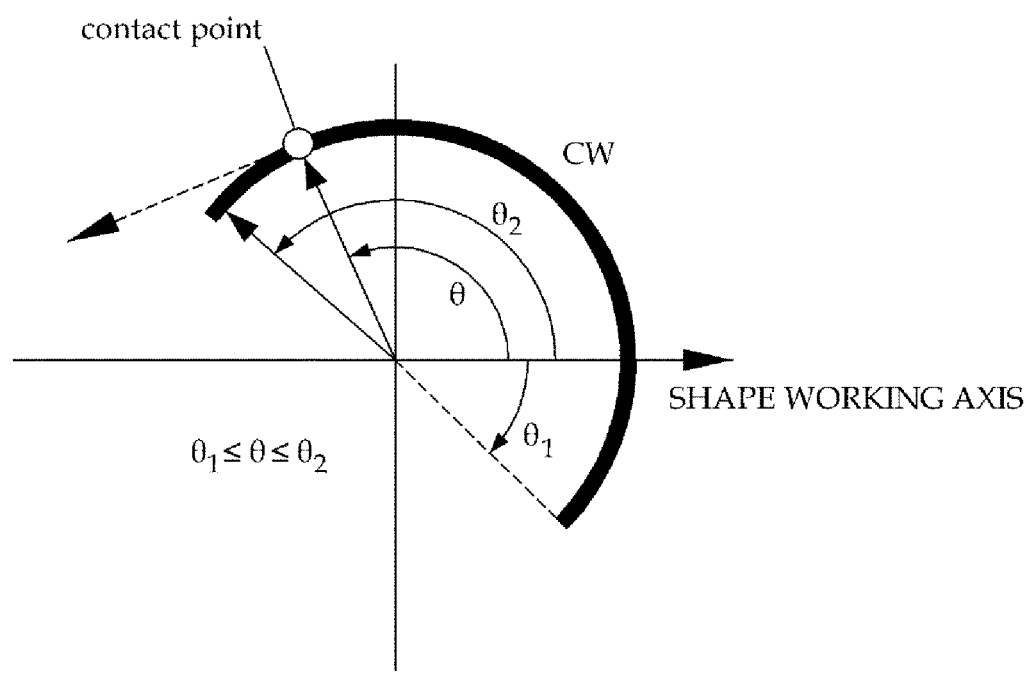
FIG. 8 is a view showing the conditions when an interference region starting point is an arcuate contact point.

In more detail, as shown in FIG. 8, an angle (θ), disposed on a circle including an arc with respect to a contact point (P) of a virtual line (depicted by a broken line) and an arc with reference to the shape working axis, exists between angles (θ1, θ2) in which a point (P1) on the arc or an end point (P2) are disposed.

Figure 12:
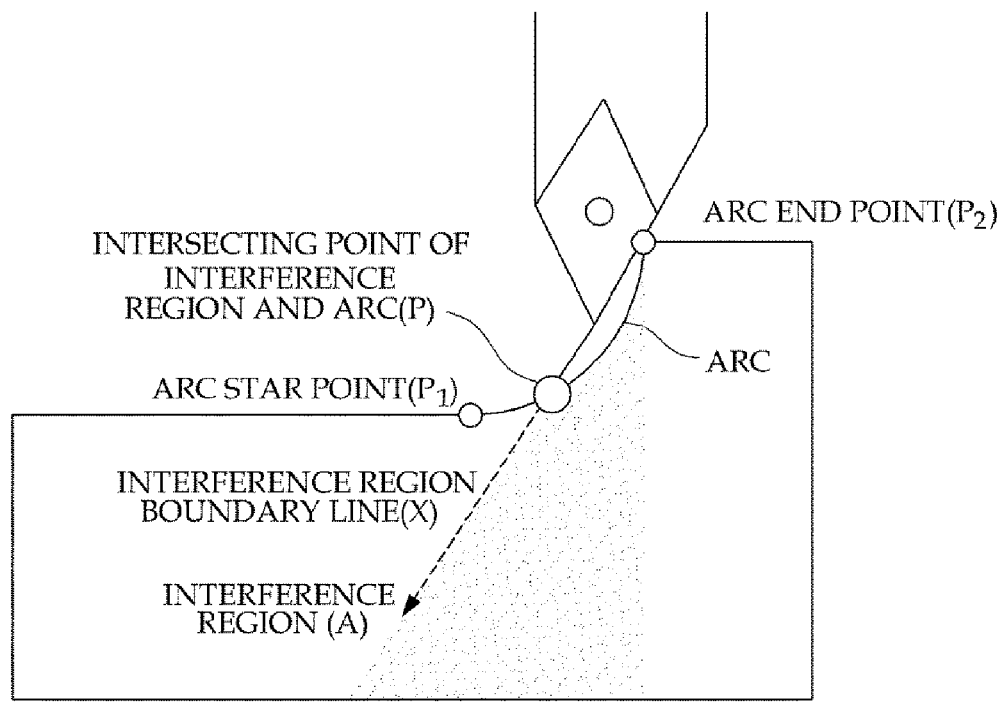
FIG. 12 is an exemplary view showing an interference region starting point that is not an arcuate contact point, but is an arcuate starting point or end point.

When Shape Elements are in an Arc 2—Start Point of the Interference Region is Start Point or End Point of Arc In the present case, as shown in 12 of FIG. 7, when a virtual line, connecting an intersecting point with another shape element and a start point (P1) or end point (P2) of the arc, intersects on an intersecting point (P) of the arc itself, the case in FIG. 12 occurs.

Figure 9:
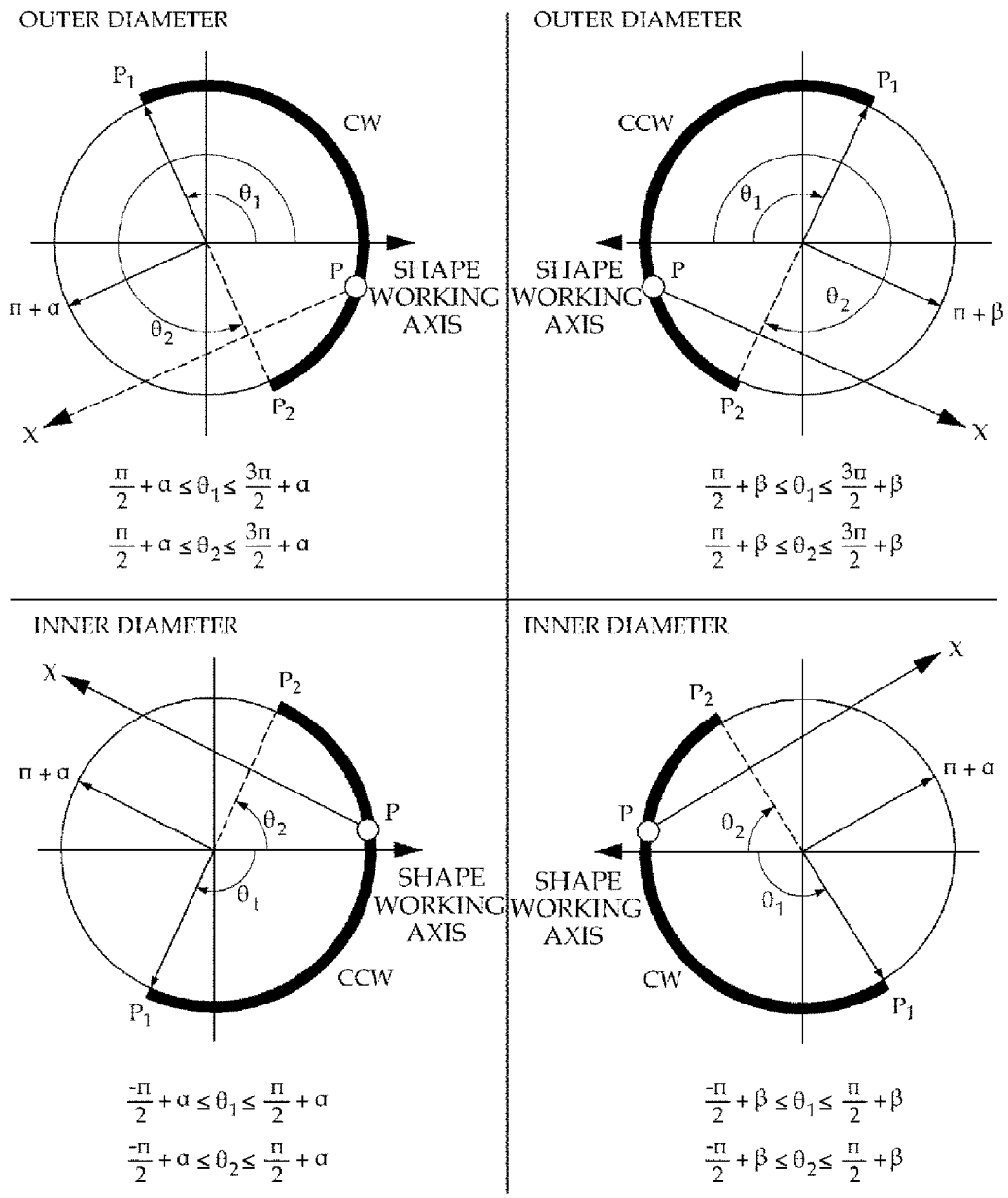
FIG. 9 is a set of diagrams showing an interference region that is formed when an interference region starting point is not an arcuate contact point, but is an arcuate starting point or end point.

In this case, the conditions in which the interference region is formed are determined differently for outer diameter processing and for inner diameter processing, as shown in FIG. 9.

That is, in the case of outer diameter processing, as shown in the left upper end and right upper end of FIG. 9, regarding the start point (P1) or end point (P2) of the arc with respect to the shape working axis, when the angles (θ1, θ2) disposed on a circle and including the arc are disposed between 90°+tool angle to 270°+tool angle, an interference region is formed. The left upper end of FIG. 9 shows when the tool angle is a minor cutting edge angle (α), and the right upper end shows when the tool angle is a major cutting edge angle (β).

In the case of outer diameter processing, conditions in which an interference region is formed are shown in Formulas 1 and 2 below.

$$\frac{\pi}{2} + \alpha \le \theta_1 \le \frac{3\pi}{2} + \alpha \qquad \text{[Formula 1]}$$

$$\frac{\pi}{2} + \alpha \le \theta_2 \le \frac{3\pi}{2} + \alpha$$

$$\frac{\pi}{2} + \beta \le \theta_1 \le \frac{3\pi}{2} + \beta \qquad \text{[Formula 2]}$$

$$\frac{\pi}{2} + \beta \le \theta_2 \le \frac{3\pi}{2} + \beta$$

Next, in the case of inner diameter processing, as shown in the left lower end and right lower end of FIG. 9, regarding the start point (P1) or end point (P2) of the arc with respect to the shape working axis, when the angles (θ1, θ2) disposed on a circle and including the arc are disposed between −90°+tool angle to −90°+tool angle, an interference region is formed. The left lower end of FIG. 9 shows when the tool angle is a minor cutting edge angle (a), and the right lower end shows when the tool angle is a major cutting edge angle (θ).

In the case of inner diameter processing, the conditions in which an interference region is formed are shown in Formulas 3 and 4 below.

$$\frac{-\pi}{2} + \alpha \le \theta_1 \le \frac{\pi}{2} + \alpha$$
$$\frac{-\pi}{2} + \alpha \le \theta_2 \le \frac{\pi}{2} + \alpha$$

[Formula 3]

$$\frac{-\pi}{2} + \beta \le \theta_1 \le \frac{\pi}{2} + \beta$$
$$\frac{-\pi}{2} + \beta \le \theta_2 \le \frac{\pi}{2} + \beta$$

[Formula 4]

For the above-described shape elements being in an arc, the symbol for the tool angle, under the conditions in which interference regions L1 and L2 are formed, has a positive (+) value (in FIG. 4) when the position of a tool edge corresponding to the tool angle is to the left of a moving direction of the shape working axis, and has a negative (−) value (in FIGS. 5, 10, and 11) when the position of the tool edge is to the right of the moving direction of the shape working axis.

Further, whether the shape elements are included in the interference regions is determined according to the symbol of the currently defined tool angle. For example, as shown in FIG. 4, if the currently defined tool angle symbol is positive (+), a shape to the left of the interference region vector moving direction exists within the interference region. Similarly, as shown in FIGS. 5, 10, and 11, when the currently defined tool angle symbol is negative (−), a shape to the right of the interference region vector moving direction exists within the interference region.

A method for detecting whether an interference region is included, using the above-described shape working axis and tool angle is applied in the same way to outer diameter, inner diameter, and sectional processing.

According to an exemplary embodiment, the cutting surface forming step S60 of FIG. 2 may be configured in the four steps below.

(First step) Receive an input of the axial direction cutting depth and the processing direction, and set an offset value and an offset direction of a cutting surface.

(Second step) Obtain the first offset cutting surface from a cutting surface that passes a highest point of a closed shape obtained in the closed shape forming step S50 in FIG. 2, according to an offset value and an offset direction obtained in the first step.

(Third step) Continuously obtain offset cutting surfaces in an offset direction from a first offset cutting surface obtained in the second step.

(Fourth step) End the offset process if an offset cutting surface passes the lowest point of a closed shape obtained in the closed shape forming step S50 in FIG. 2.

Further, according to exemplary embodiments of the present disclosure, the tool path forming step S80 in FIG. 2 may be configured in 8 steps below.

(First step) The intersecting points obtained in the intersecting point calculating step S70 in FIG. 2 are arranged along a processing direction.

(Second step) Sequentially circulate the intersecting points obtained in the first step and connect intersecting points that do not cross the shape to obtain a tool path.

(Third step) Circulate the continuous offset cutting surface obtained in the cutting surface forming step S60 in FIG. 2 and repetitively perform the first step and the second step.

(Fourth step) Store the tool paths generated from the third step.

(Fifth step) If shapes exist between the tool paths stored in the fourth step, add paths following the shapes between the tool paths.

(Sixth step) Receive an input of entry and withdrawal information of the tool paths by a user.

(Seventh step) Generate entry and withdrawal tool paths from the input entry and withdrawal information received in the sixth step.

(Eighth step) Additionally insert the entry and withdrawal tool paths generated in the seventh step in start and finish points of the tool paths generated and stored in the fourth and fifth steps.

As described above, although certain exemplary embodiments of the present disclosure have been described in detail, it is to be understood by those skilled in the art that the spirit and scope of the present disclosure are not limited to the certain exemplary embodiments, but are intended to cover various modifications and changes without departing from the subject matter of the present disclosure.

Accordingly, since the aforementioned exemplary embodiments are provided to inform those skilled in the art to which the present disclosure pertains of the scope of the present disclosure, it should be understood that the exemplary embodiments are illustrative only in all aspects and are not intended to be in any way limiting, and the present disclosure is just defined by the scope of the appended claims.

The present disclosure can provide a method for forming a tool path capable of effectively avoiding an interference region formed by a tool path of a tool not only for a straight line shape but also for an arc shape.

Further, the present disclosure provides an integrated method capable of defining and avoiding an interference region for various types of processing techniques including inner diameter and outer diameter processing and sectional processing, so as to increase the efficiency of tool path forming by enabling the effective forming of tool paths for various types of processing techniques including inner diameter and outer diameter processing and sectional processing.

The invention claimed is:

1. A tool path forming method in a milling processing system, the method comprising:
 (A) a shape offset step of receiving an input of a shape from a user or recognizing a shape depicted in a drawing, dividing the shape into one or more shape elements, and offsetting the inputted shape;
 (B) shape revising steps of receiving tool information and forming an interference region formed by means of a tool angle of a tool, determining whether the interference region is formed for each of the shape elements on the basis of a shape working axis of the shape elements and the tool angle of the tool, and revising the shape elements for preventing the forming of the interference region, wherein step (B) further comprises, when the shape elements are in a straight line, and when an angle formed by the shape elements and the shape working axis is greater than an absolute value of the tool angle of the tool, including the shape elements in the interference region;
 (C) a closed shape forming step of making revised shapes into closed shapes;
 (D) a cutting surface forming step of forming a cutting surface in a processing depth direction; and (E) tool path forming steps of obtaining an intersecting point of the cutting surface and the shape elements, and forming a tool path from the intersecting point.

2. The tool path forming method of claim 1, further comprising:
(F) an unprocessed region detecting step of detecting whether shape elements included in an unprocessed region to the interference region in step (B) exist; and
(G) an uncut region tool path forming step of changing a tool to a tool capable of processing the unprocessed region when the unprocessed region is detected, and forming an uncut region tool path.

3. The tool path forming method of claim 1, wherein step (B) further comprises, when the shape elements are in an arc, and when a virtual line is formed having an angle formed by the shape working axis and 180°+the tool angle, determining whether to include the arc in the interference region when the virtual line meets the arc that is one of the shape elements at an intersecting point, and when the virtual line intersects the arc that is one of the shape elements, and including the arc in the interference region when a start point or an end point of the arc exists between angles ($\theta 1$, $\theta 2$) disposed on a circle including the arc that are between 90°+the tool angle and 270°+the tool angle or between −90°+the tool angle and 90°+the tool angle, with respect to the shape working axis.

4. A tool path forming method in a milling processing system, the method comprising:
(A) a shape offset step of receiving an input of a shape from a user or recognizing a shape depicted in a drawing, dividing the shape into one or more shape elements, and offsetting the inputted shape;
(B) shape revising steps of receiving tool information and forming an interference region formed by means of a tool angle of a tool, determining whether the interference region is formed for each of the shape elements on the basis of a shape working axis of the shape elements and the tool angle of the tool, and revising the shape elements for preventing the forming of the interference region, wherein step (B) further comprises, when the shape elements are in an arc, and when a virtual line is formed having an angle formed by the shape working axis and 180°+the tool angle, determining whether to include the arc in the interference region when the virtual line meets the arc that is one of the shape elements at an intersecting point, and when the virtual line intersects the arc that is one of the shape elements, and including the arc in the interference region when a start point or an end point of the arc exists between angles ($\theta 1$, $\theta 2$) disposed on a circle including the arc that are between 90°+the tool angle and 270°+the tool angle or between −90°+the tool angle and 90°+the tool angle, with respect to the shape working axis;
(C) a closed shape forming step of making revised shapes into closed shapes;
(D) a cutting surface forming step of forming a cutting surface in a processing depth direction; and
(E) tool path forming steps of obtaining an intersecting point of the cutting surface and the shape elements, and forming a tool path from the intersecting point.

5. The tool path forming method of claim 4, further comprising:
(F) an unprocessed region detecting step of detecting whether shape elements included in an unprocessed region to the interference region in step (B) exist; and
(G) an uncut region tool path forming step of changing a tool to a tool capable of processing the unprocessed region when the unprocessed region is detected, and forming an uncut region tool path.

6. The tool path forming method of claim 4, wherein step (B) further comprises, when the shape elements are in a straight line, and when an angle formed by the shape elements and the shape working axis is greater than an absolute value of the tool angle of the tool, including the shape elements in the interference region.

* * * * *